April 20, 1937.  J. DICHTER  2,077,827
GLASSWORKING MACHINE
Filed Feb. 6, 1936   2 Sheets-Sheet 1
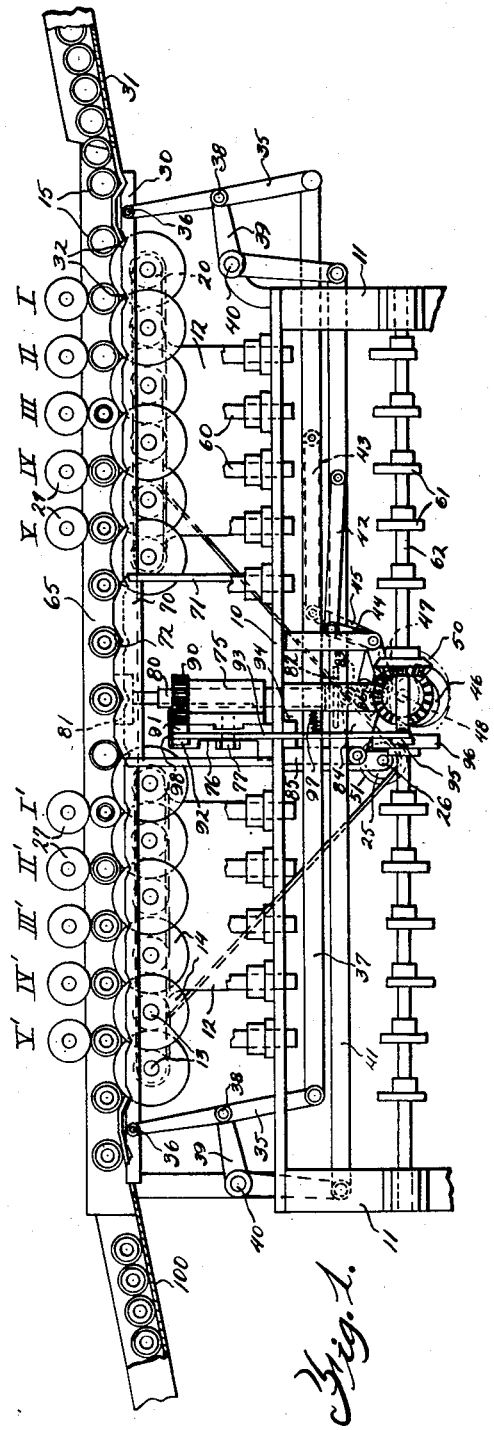
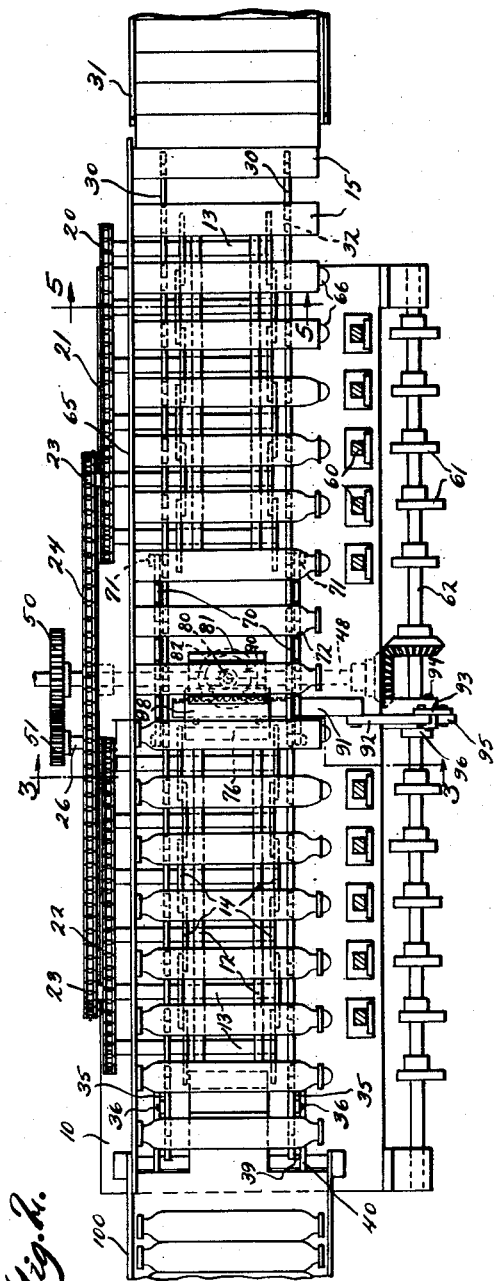
INVENTOR
JAKOB DICHTER
BY Charles B. Belknap
ATTORNEY April 20, 1937.   J. DICHTER   2,077,827
GLASSWORKING MACHINE
Filed Feb. 6, 1936   2 Sheets-Sheet 2
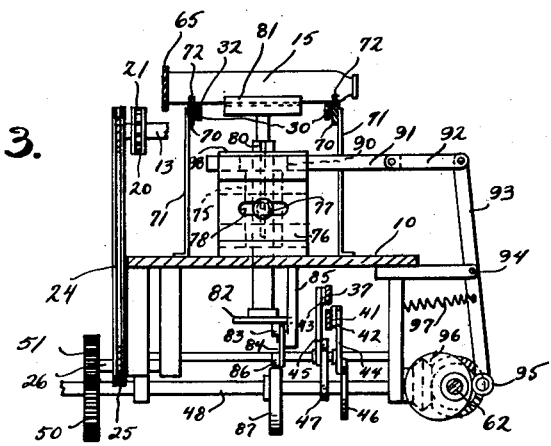
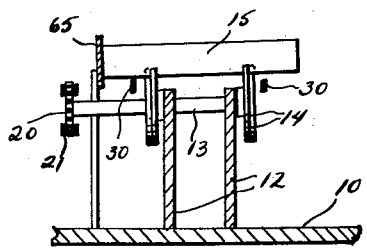
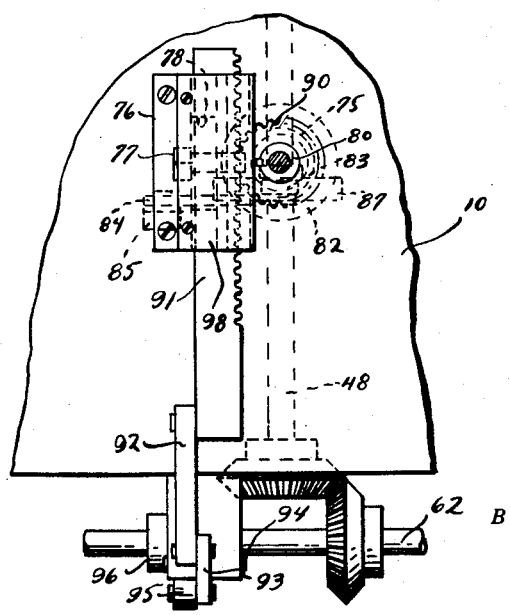
INVENTOR
JAKOB DICHTER
BY
ATTORNEY Patented Apr. 20, 1937

2,077,827

UNITED STATES PATENT OFFICE 2,077,827

GLASSWORKING MACHINE

Jakob Dichter, Berlin-Schoneberg, Germany

Application February 6, 1936, Serial No. 62,694
In Germany November 15, 1934

14 Claims. (Cl. 49—7)

This invention relates to a glass working machine and has particular reference to a machine adapted to shape, fire-glaze or otherwise process portions of lengths of glass rod or tubing.

One of the primary objects of this invention is to provide a machine of the above mentioned character, the operation of which may be conveniently supervised by a single attendant.

A further object of the invention is to provide a machine of the above mentioned character which is simple in construction and in which all of the processing mechanisms may be located at one side of the machine.

Numerous other objects and advantages of this invention will become more apparent as the following description proceeds particularly when reference is had to the accompanying drawings wherein Fig. 1 is a highly diagrammatic side elevational view of a machine in which the invention is embodied;

Fig. 2 is a diagrammatic top plan view of the machine shown in Fig. 1;

Fig. 3 is a transverse sectional view through the machine taken substantially on the line 3—3 of Fig. 2;

Fig. 4 is a fragmentary enlarged plan view of the portion of the machine shown in Fig. 3; and Fig. 5 is a fragmentary sectional view through the machine taken substantially on the line 5—5 of Fig. 2.

Heretofore in the forming of articles from glass rods or glass tubing, it has been the custom to cut the tubing or rod into measured lengths, which may for convenience be called blanks, to move these blanks along a definite path and in a direction normal to their longitudinal axes and to then process one end of the blank by mechanism located at one side of the path of movement of the blank and then to process the other end of the blank by mechanism located at the other side of the path of movement of the blank. By the term "processing" is meant any treatment of the blank incident to the production of the final desired article, which treatment may consist in shaping the blank, fire-glazing the same or any other necessary or desired operation.

As illustrative of the prior practice, reference might be made to the machine disclosed in Patent No. 1,569,652 issued to Hans N. Halversen on January 12, 1926. In this patent there is disclosed a machine for forming test tubes. Measured lengths of glass tubing are fed to conveyors which intermittently move the tubes to each of a series of processing stations. As previously mentioned, the tubes are moved in a direction normal to their longitudinal axes.

During the travel of the tubes through the machine one end of each tube is first flared outwardly by a suitable tool disposed at one side of the machine. Next, the other end of each tube is flared outwardly by a second tool located at the other side of the machine. The tubes are then heated intermediate their ends and the sections drawn apart on opposite sides of the heated portions thereof and rounded bottoms blown on the tube sections to form test tubes.

In machines such as disclosed by the above mentioned patent it is necessary to provide heating means and shaping means on each side of the machine and this makes it difficult for the machine to be properly taken care of by one attendant. Additionally, it is necessary to make the machine relatively large because driving means for the shaping mechanisms must be provided on each side of the machine.

The present invention contemplates the elimination of the above difficulties by providing means whereby the blank being processed can be reversed end for end whereby after one portion thereof has been placed in a position to be acted upon by the processing means, the blank may be reversed and a second portion located in a position to be acted upon by the processing means. Thus if the invention be incorporated in a machine of the type disclosed in the Halverson patent the means for heating and flaring out the ends of the glass tube may all be located on one side of the machine, with the result that all of the shaping mechanisms may be actuated by a single cam shaft or other operating means.

For the sake of convenience, the invention will be described as being incorporated in a machine for forming necks on the ends of glass tubes and in which the tubes are caused to travel along a predetermined path and are caused to rest momentarily at each of a plurality of processing stations. It is to be understood however, that in its broader aspects the invention is directed more to the provision of a means for supporting and for reversing a glass blank so that first one portion thereof and then a second portion thereof may be located in a position to be acted upon by a suitable processing means.

Referring now to the drawings wherein like reference characters designate corresponding parts throughout all views, the numeral 10 designates a suitable base plate which is supported in any desired manner as for example by legs 11. Journalled in suitable supports 12 which are carried by the base 10 are shafts 13 which carry rollers 14. The shafts are so arranged that the rollers 14 provide seats for the tubular blanks 15 to be processed.

The rollers are adapted not only to support the blanks but also to rotate the blanks and for this purpose the rollers are rotatably driven in any desired manner as for example by providing sprocket wheels 20 on the shafts 13 at one side of the machine. The group of sprockets at one end of the machine are interconnected by a sprocket chain 21 while the group of sprockets at the other end of the machine are interconnected by a sprocket chain 22. Additionally, certain of the shafts at each end of the machine are extended and are provided with sprocket wheels 23 these sprocket wheels being interconnected by a sprocket chain 24 adapted to be driven by a sprocket wheel 25 on a shaft 26.

The rollers 14 may be rotatively driven by the means above described or by any other desired means but it is to be noted that the driven means for these rollers may be conveniently located all at one side of the machine, since there is no necessity to provide at this side of the machine means for heating or shaping the glass blanks. For holding the blanks on the rollers 14 during the processing operations, rollers 27 may be provided, these rollers being of standard construction and being driven in the usual manner.

The blanks are moved longitudinally of the machine to each of a plurality of processing stations, numbered I, II, III, IV, and V at one end of the machine and I', II', III', IV', and V' at the other end of the machine. For moving the blanks to each of these stations there are provided transport bars 30 to which the blanks are fed from a suitable hopper or chute 31. The transport bars are provided with recesses 32 in which the blanks rest while being moved by the bars and the bars are oscillated or given first and up and forward movement and then a down and backward movement whereby the blanks are intermittently deposited in the spaces between adjacent rollers where they rest momentarily and are rotated by the rollers.

While any desired mechanism may be provided for imparting the above described movement to the transport bars, there is shown for the purposes of illustration links 35 pivoted as at 36 to the ends of the transport bars and pivotally connected at their lower ends to a longitudinally extending link or rod 37. Intermediate their ends the links 35 are pivotally connected as at 38 to bell crank levers 39 which are pivotally mounted as at 40. The other arms of these bell crank levers are pivotally connected to the ends of a rod 41.

The rods 37 and 41 are reciprocated by links 42 and 43 actuated by bell crank levers 44 and 45 respectively, these levers in turn being actuated by cams 46 and 47 which are mounted on a shaft 48. This shaft extends transversely of the machine and is connected to any suitable source of power (not shown). This shaft may also be provided with gear 50 which engages a gear 51 mounted on the shaft 26 for driving this shaft and thus the chains which rotate the rollers 14.

For acting on the blanks as they are moved to the several processing stations there are provided tools 60. There may be any desired number of these tools and they may be of any desired character so as to impart the desired configuration to the tube ends. The tools are adapted to be actuated in accordance with the usual practice by cams 61 located on a cam shaft 62.

Preferably there is provided means for maintaining the tubes at a definite position transversely of the machine as they travel longitudinally of the machine. This means is shown as comprising a guard rail 65 which extends longitudinally of the machine at one side thereof and against which the tube ends are caused to bear by inclining the shafts 13 as illustrated in Fig. 5 of the drawings. Obviously, however, any other desired means might be provided for maintaining the proper positioning of the tube blanks with reference to the longitudinal axis of the machine.

As the tubes are fed to the machine the ends thereof which are adjacent the tools 60 are heated by suitable burners 66. As the tubes are moved successively to stations I to V inclusive they are acted upon by the tools 60 to form, for example, necks and flanged ends on the same. The tubes are then moved through one or two processing stations (not numbered) during which the ends are permitted to cool slightly after which the tubes are reversed end for end so that the other ends thereof may be processed at stations I' to V' inclusive.

For effecting this reversal of the tubes, the following structure is provided. Disposed between stations V and I' are bars 70 which are suitably supported from the base 10 as by standards 71. These bars take the place of the rollers 14 and are provided with notches 72 in which the tubes momentarily rest. Located below the bars 70 is a bearing 75, which is fixed to a support 76 by a bolt 77. The bolt passes through a slot 78 in the support with the result that the bearing may be adjusted transversely of the machine.

Mounted for vertical reciprocation and for rotation in the bearing 75 is a shaft 80 which carries at its upper end a block 81 which is recessed to receive the tube blank. At its lower end the shaft carries a disk 82 which is engaged by a roller 83 on one end of an arm 84. This arm is pivotally mounted on a support 85 and carries on its other end a roller 86 which rides on a cam 87 which may be fixed to the shaft 48. It will be apparent that as the shaft 48 rotates the arm 84 will be actuated to periodically elevate the shaft 80 and the block 81.

Splined to the shaft 80 is a gear 90 which is engaged by a rack 91 carried by an arm 92. This arm is pivotally secured to a lever 93 which is pivotally mounted as at 94 and which carries at its other end a roller 95 adapted to engage a cam 96 mounted on the cam shaft 62. A spring 97 is provided for holding the roller 95 in engagement with its cam.

For preventing upward movement of the gear 90 when the shaft 80 is moved upwardly, there is secured to the upper end of the support 76 a plate 98. The arrangement is such that the gear 90 while being adapted for rotation is prevented from vertical movement both downwardly by the support 76 and upwardly by the plate 98. The rack 91 is likewise guided by the adjacent portions of the support 76 and plate 98.

The operation of this blank reversing mechanism is as follows. When the blank is momentarily positioned in the pair of notches 72 with which the block 81 is in alignment, the block is elevated by the cam 87 and is then rotated through the rack and gear mechanism which is actuated by the cam 96. The block is rotated through an arc of 180° whereby the blank is reversed end for end so that the opposite end thereof is positioned adjacent the tools 60 and the heating means 66 which are positioned adjacent stations I' to V' inclusive. Thus during the further travel of the blanks through the machine the opposite ends thereof are processed, the finished blanks being finally discharged from the machine onto an inclined discharge chute 100.

It is to be understood that the adjustable mounting of the bearing 75 permits this bearing to be adjusted transversely of the machine so that the fulcrum of the reversing mechanism is always disposed at the middle of the length of the blank being processed. The fact that the blank is accurately located transversely of the machine by virtue of the rail 65 permits the proper positioning of the bearing 75 with reference to the blank.

From the above it is believed that the structure and operation of the invention will be clearly apparent. Provision is made to support a blank with one end thereof adjacent the processing means or mechanism and to then reverse the blank end for end whereby the other end thereof is positioned adjacent the processing means. This reversing means may be disposed at any point in the length of a machine through which the tubes travel longitudinally or may be obviously associated with a machine of any desired character adapted to process glass articles.

The tools or processing mechanisms located at stations I' to V' inclusive may be the same or different from those located at stations I to V inclusive so that both ends of the blank may be shaped the same or the ends of the blank shaped differently as desired. Additionally, it will be apparent that after the ends of the blank are shaped, the blank may be divided into two sections and bottomed either at further stations on the same machine or on a separate machine.

When the invention is incorporated in a machine of the type disclosed, it will be apparent that a single cam shaft will be sufficient to actuate all of the tools or forming mechanisms and that further this cam shaft and all of the tools may be located at one side of the machine whereby they may be given careful attention by the attendant of the machine.

While the invention has been described with some detail, it is to be understood that the description is only illustrative of the invention and is not definitive of the limits of the inventive idea, the right being reserved to make such changes in the details of construction as will fall within the purview of the attached claims.

What I claim as my invention is:

1. A machine of the class described including in combination, means for processing a glass blank, means for supporting a glass blank with a portion thereof in position to be acted upon by said processing means, and means for reversing said blank end for end to locate a second portion thereof in a position to be acted upon by said processing means.

2. A machine of the class described including in combination, means for processing a glass blank, means for supporting a glass blank with one end thereof in position to be acted upon by said processing means, and means operating after the said one end of the blank is processed to reverse the blank end for end to position the other end thereof in a position to be acted upon by said processing means.

3. In a machine of the class described, means for moving a glass blank in a direction normal to its longitudinal axis, means for processing one end of said glass blank during a portion of its movement, means for reversing the glass blank end for end, and means for then processing the other end of the glass blank.

4. In a machine of the class described, means for moving a glass blank in a direction normal to its longitudinal axis, a plurality of mechanisms disposed at one side of the path of movement of said glass blank for processing the glass blank, said processing mechanisms being so arranged that they process the adjacent end of the glass blank, and means for reversing the glass blank end for end at one point during its travel whereby after one end of the blank has been processed the other end thereof is located adjacent said processing mechanisms.

5. In a machine of the class described, means for intermittently moving a glass blank in a direction normal to its longitudinal axis, means for supporting said blank during the intervals that the same is not moved by said first mentioned means, means for processing one end of said glass blank during one of the intervals that it is not being moved, means for reversing the glass blank end for end, and means for then processing the other end of the glass blank during one of the intervals that it is not being moved.

6. In a machine for processing the ends of an elongated glass blank, means for moving the glass blank along a definite path and in a direction normal to its longitudinal axis, processing means disposed at one side of the path of travel of the glass blank arranged to act on the adjacent end thereof, and means operating after one end of the blank has been processed to reverse the blank end for end to position the other end thereof adjacent the said processing means.

7. In a machine of the class described, means for intermittently moving a glass blank along a definite path and in a direction normal to its longitudinal axis, means for supporting said blank during the intervals that the same is not being moved by said first mentioned means, means located intermediate the ends of the path of travel of the blank for reversing the blank end for end during one of the intervals that the blank is not being moved by the moving means, and processing means disposed wholly to one side of the median line of the path of travel of the blank arranged to process first one end of the blank and then after the blank has been reversed to process the other end thereof.

8. In a machine of the class described, means for supporting a glass blank, a member normally disposed below said supporting means, said member being adapted when elevated to support the blank, means for raising said member to lift the blank above the supporting means, and means for rotating the member while the same is elevated to reverse the position of the blank with reference to the supporting means.

9. In a machine of the class described, means for supporting a glass blank, a member normally disposed below the supporting means and having a recess in which the blank is adapted to rest, a shaft mounting said member, means for moving said shaft upwardly to raise said blank above the first mentioned supporting means, and means for rotating the shaft through 180° to reverse the original position of the blank.

10. In a machine of the class described, means for intermittently moving a glass blank along a definite path and in a direction normal to its longitudinal axis, means for supporting said blank during the intervals that the same is not being moved, a member located intermediate the ends of the path of travel of the blank, said member being normally located below said supporting means and being adapted when elevated to lift said blank from said supporting means, means for rotating the member through 180° to reverse the original position of the blank, means providing for a lowering of said member after the rotating movement thereof to reposition the blank on its original supporting means, and processing means disposed wholly to one side of the median line of the path of travel of the blank arranged to process first one end of the blank and then after the blank has been reversed to process the other end thereof.

11. In a machine of the class described, means for intermittently moving a glass blank along a definite path and in a direction normal to its longitudinal axis, means for supporting said blank during the intervals that the same is not being moved by said first mentioned means, a member normally disposed below the path of travel of the blank adapted when elevated to lift the blank above said supporting means, a shaft fixed to said member and mounted for vertical movement, means for moving said shaft vertically to elevate the blank, means for rotating the shaft through 180° while the member and blank are elevated, means providing for the lowering of said shaft after the rotation thereof to return the blank to its position on said supporting means, a bearing for said shaft, means mounting said bearing for adjustment transversely of the path of travel of the blank, and processing means disposed wholly to one side of the median line of the path of travel of the blank arranged to process first one end of the blank and then after the position of the blank has been reversed to process the other end of the blank.

12. In a machine of the class described, means for moving a glass blank along a definite path, means disposed to one side of the median line of the path of movement of the blank for processing a portion of the blank during a part of the movement of the blank along said path, and means located intermediate the ends of the path of movement of the blank for turning the blank to locate a second portion of the blank on that side of the median line of the path of movement of the blank formerly occupied by the first mentioned portion of the blank whereby the second portion of the blank is positioned so as to be acted upon by the processing means during further movement of the blank along its path of travel.

13. In a machine of the class described, means for supporting a glass blank, a member normally disposed below said supporting means, said member being adapted when elevated to support the blank, means for raising said member to lift the blank above the supporting means, and means for rotating the member while the same is elevated to change the position of the blank with reference to the supporting means.

14. In a machine of the class described, means for supporting a glass blank, processing means disposed wholly to one side of said supporting means and arranged to act on a portion of the blank when the latter is supported by the said supporting means, and means operable after the said first mentioned portion of the blank has been acted upon by said processing means to turn said blank to locate a second portion thereof in a position to be acted upon by said processing means.

JAKOB DICHTER.